(12) United States Patent
Heckendorn et al.

(10) Patent No.: US 7,708,504 B2
(45) Date of Patent: May 4, 2010

(54) PNEUMATIC CONVEYANCE APPARATUS AND PROCESS

(75) Inventors: Frank M. Heckendorn, Aiken, SC (US); Athneal D. Matzolf, Martinez, GA (US); Kevin R. Hera, North Augusta, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 932 days.

(21) Appl. No.: 11/214,240

(22) Filed: Aug. 29, 2005

(65) Prior Publication Data

US 2007/0048097 A1  Mar. 1, 2007

(51) Int. Cl.
*B65G 53/60* (2006.01)

(52) U.S. Cl. .................. 406/152; 406/151; 406/153

(58) Field of Classification Search ............ 406/92, 406/151, 152, 153
See application file for complete search history.

(56) References Cited

U.S. PATENT DOCUMENTS

| 3,512,841 A | | 5/1970 | Kollasch et al. |
| 3,584,919 A | | 6/1971 | Canonico |
| 3,664,354 A | * | 5/1972 | Minbiole et al. ............. 134/61 |
| 3,990,748 A | | 11/1976 | Ghusn et al. |
| 4,372,712 A | * | 2/1983 | Powell et al. ............... 406/153 |
| 4,570,287 A | * | 2/1986 | Kerschner et al. ............. 15/346 |
| 4,799,863 A | * | 1/1989 | Gannon ....................... 417/84 |
| 5,071,289 A | | 12/1991 | Spivak |
| 5,195,852 A | * | 3/1993 | Malugani et al. ............. 406/153 |
| 5,615,980 A | * | 4/1997 | Mauchle ....................... 406/19 |
| 5,667,365 A | | 9/1997 | Miller et al. |
| 5,697,116 A | * | 12/1997 | Loferer ....................... 15/21.2 |
| 6,036,407 A | | 3/2000 | Nester |
| 6,049,941 A | * | 4/2000 | Vollenweider, II ......... 15/327.5 |
| 6,089,795 A | * | 7/2000 | Booth .......................... 406/43 |
| 6,254,315 B1 | | 7/2001 | Pfeiffer |
| 6,267,540 B1 | * | 7/2001 | Haas .......................... 406/153 |
| 6,276,452 B1 | | 8/2001 | Davis et al. |
| 6,732,897 B2 | * | 5/2004 | DeHart et al. ............... 226/97.4 |
| 6,857,826 B2 | * | 2/2005 | Seitz ........................... 406/34 |
| 6,974,279 B2 | * | 12/2005 | Morohashi et al. .......... 406/173 |

OTHER PUBLICATIONS

Pentek, Inc., "Roto-Peen Scaler", Bulletin No. M-700, Pentek, Inc., Decontamination Products Division, Coraopolis, PA, 1996.
Webpage, TFP-9 Scarifier, Novatek Corporation, Aug. 21, 2005.
Rosenberger, *Impact Cleaning*, 1939, Figure 47 on p. 51 & last paragraph p. 52, Penton Publishing Co., Cleveland, OH, 466 pages.

* cited by examiner

*Primary Examiner*—Douglas A Hess
(74) *Attorney, Agent, or Firm*—J. Bennett Mullinax, LLC

(57) ABSTRACT

A pneumatic nozzle capable of removing dry solid debris, liquids, and mixtures of solid and liquid waste is provided. The pneumatic nozzle uses a pressurized gas stream to push materials through the nozzle. The force of a pressurized gas stream provides a partial vacuum to allow material to be introduced into an opening of a nozzle via a slight suction force. Thereafter, individual particles and materials introduced into the pneumatic nozzle are pushed by a stream of pressurized gas through the nozzle.

11 Claims, 4 Drawing Sheets

PNEUMATIC CONVEYANCE APPARATUS AND PROCESS

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

This invention is directed towards a pneumatic nozzle capable of removing dry solid debris, liquids, and mixtures of solid and liquid waste. The pneumatic nozzle uses a pressurized gas stream to push materials through the nozzle. The force of a pressurized gas stream provides a partial vacuum to allow material to be introduced into an opening of a nozzle via a slight suction force. Thereafter, individual particles and materials introduced into the pneumatic nozzle are pushed by a stream of pressurized gas through the nozzle.

BACKGROUND OF THE INVENTION

This invention relates to pneumatic conveyance devices. Typical pneumatic conveyance devices use a high vacuum suction device which relies upon large quantities of air or other fluids to achieve material movement into and through a nozzle. For instance, there are a variety of venturi-type nozzles which use an air supply flow that is substantially parallel to the introduced material flow. As a general rule, the more shallow, i.e., close to 0°, of the air supply introduction angle, the greater the amount of suction which may be achieved, provided a greater volume of air is supplied. Such devices are known in the art including the devices set forth in U.S. Pat. No. 3,512,841 and U.S. Pat. No. 5,071,289, both of which are incorporated herein by reference. The patents referenced above use a high air flow with an entry angle of the air to the nozzle of close to a 0° angle. As used herein, the angle referred to is in reference to the central conveyance axis of the device. While such devices are useful for creating a high suction, there are inherent limitations in their design and operation both as to the particle size, conveyance height, and overall efficiency for removal of a solid material.

Conventional pneumatic conveyors are limited in their capacity and the type of materials to be handled. While conventional pneumatic conveyors are useful for certain materials such as powders, granules, or pellets, there is a need for a pneumatic conveyor which can handle more diverse materials in terms of size, shape, and composition as well as a nozzle capable of removing materials from depths which cannot be achieved using a traditional vacuum-type nozzle.

A vacuum-type nozzle such as the ones described above are theoretically incapable of removing solid debris, liquids, or combinations of mixed liquid and solid waste from depths greater than approximately 32 feet. 32 feet is the maximum theoretical conveyance height that can be generated by a vacuum at sea level. However, given the inefficiencies of a vacuum and friction within a conveyance tube, depths greater than approximately 25 feet cannot be reliably serviced by a vacuum-type nozzle. Further, the efficiency of a vacuum-type nozzle does not provide an adequate mechanism for conveying materials great distances through a pneumatic hose or similar structure. There are a number of situations such as deep waste tanks and similar environments which accumulate waste material and debris which must be removed. Many of these environments have a depth below grade level in excess of 40 feet and, therefore, a pneumatic suction apparatus is impossible to use. Similarly, there are many situations where materials need to be conveyed a distance of 70 to 100 feet or more through a substantially horizontal conveyance hose. The vacuum-type nozzles described above lack sufficient air movement properties to achieve transport of materials such distances.

The ability to achieve an efficient material conveyance through a pneumatic nozzle and hose is directly correlated with the efficiency of the material conveyance apparatus. Material conveyance using air is a turbulent flow and associated with known pressure drop values as turbulent air passes through a hose or similar structure. It is known that the pressure drop of turbulent air through a conduit is an exponential function of the inside diameter of the conduit. Accordingly, any increase in the efficiency of the nozzle and nozzle delivery process can achieve a large effect on the transport efficiency.

Accordingly, there remains room for improvement and variation within the art directed to an apparatus and techniques for removing materials which overcome the inherent limitations of a venturi-type suction nozzle.

SUMMARY OF THE INVENTION

It is one aspect of at least one of the present embodiments to provide for a pneumatic conveyance nozzle which has the capability of transporting a waste material a minimum height of approximately 40 feet.

It is a further aspect of at least one of the present embodiments to provide for a pneumatic conveyance nozzle in which a pressurized gas flowing through the nozzle induces a partial vacuum along an opening of the nozzle and through which particles and other materials can be uptaken. As the uptaken materials are introduced into the nozzle, the material is entrained into the pressurized gas stream where the pressurized gas is used to push the particles through the nozzle It is another aspect of at least one of the present embodiments to provide a pneumatic conveyance nozzle in which the pressurized gas is introduced into a nozzle at approximately 30° relative to a nozzle conduit having an axis defining an inlet along a first end of the conveyance apparatus and the conduit further defining a nozzle outlet on an opposite end of the conduit. The pressurized gas is directed into an cylindrical-shaped chamber within the nozzle. A tapered plug positioned within the chamber directs the air flow axially toward the nozzle outlet. The tapered plug further defines a bore therethrough and which is in communication with an inlet of the nozzle. As the pressurized gas flows toward an outlet of the nozzle, a partial vacuum is created through the bore, the outlet providing a mechanism for introducing material into the nozzle via the partial vacuum. Introduced material passes through the tapered plug bore and is directed to a mixing chamber opposite the tapered bore. The material is then entrained within the pressurized gas flow.

It is still a further and more particular aspect of at least one of the present embodiments to provide for a process of conveying waste material through a nozzle comprising the steps of supplying a nozzle having an inlet for receiving a material mixture and an outlet for discharging the waste material mixture; introducing into the nozzle a supply gas, the gas entering the nozzle and impinging upon a tapered wall position within a cylindrical chamber and which directs the supply air toward an outlet; establishing a reduced pressure at an inlet of the nozzle, the reduced pressure established by the directional flow and velocity of the supply gas; introducing the waste material mixture into the inlet, the reduced pressure conveying the material mixture into an interior of the nozzle; intermixing the waste material and the supply gas within a mixing chamber defined within an interior of said nozzle; pushing the material mixture from the chamber by the continuous flow of the supply gas through the nozzle; wherein the material mixture and the supply gas exits the nozzle.

It is a further aspect of at least one of the present embodiments to provide a pneumatic nozzle comprising a substantially linear conduit having an inlet defined along one end of the conduit and an outlet defined on the opposite end of the conduit; a coupling attached to a side of the conduit, the conduit adapted for introducing a pressurized supply gas into a receiving chamber defined within an interior of the chamber, the receiving chamber having disposed therein a conical plug in which the outer wall is tapered toward the outlet, the conical plug further defining a bore therethrough, the bore being in axial alignment with the inlet and the outlet of the conduit; wherein when the supply gas is introduced through the coupling, the supply gas enters a cylindrical-shaped chamber and is directed along a gap defined between the outer wall of the conical plug and an interior nozzle wall toward the outlet, the flow of the supply gas creating a negative pressure at the inlet which may be used to introduce a material into the interior of the nozzle, where the supply gas pushes the material toward an outlet of the nozzle.

It is still a further aspect of at least one of the present embodiments to provide a nozzle for the uptake and transport of material comprising a conduit having an inlet, an outlet, and an axial passageway defined therebetween; a supply gas coupling having a coupling inlet and a coupling outlet, the coupling outlet in communication with a chamber defined within the axial passageway; a plug extending from the inlet and defining a bore therebetween, the bore in alignment with the axial passageway, the plug further defining an exterior wall surface, a portion of the exterior wall surface extending through the chamber; a gap defined between an exterior wall of the plug and an interior wall of the conduit, the gap providing communication between the chamber and a mixing chamber, the mixing chamber defined by an interior of the conduit and opposite a plug terminus, the mixing chamber in further communication with the outlet; wherein when a supply gas enters the chamber, the supply gas passes through the gap and enters into the mixing chamber, the flow of the supply gas through the mixing chamber establishing a reduced pressure at the inlet and through which a debris material may enter the nozzle, passing through the plug bore and entering into the mixing chamber.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
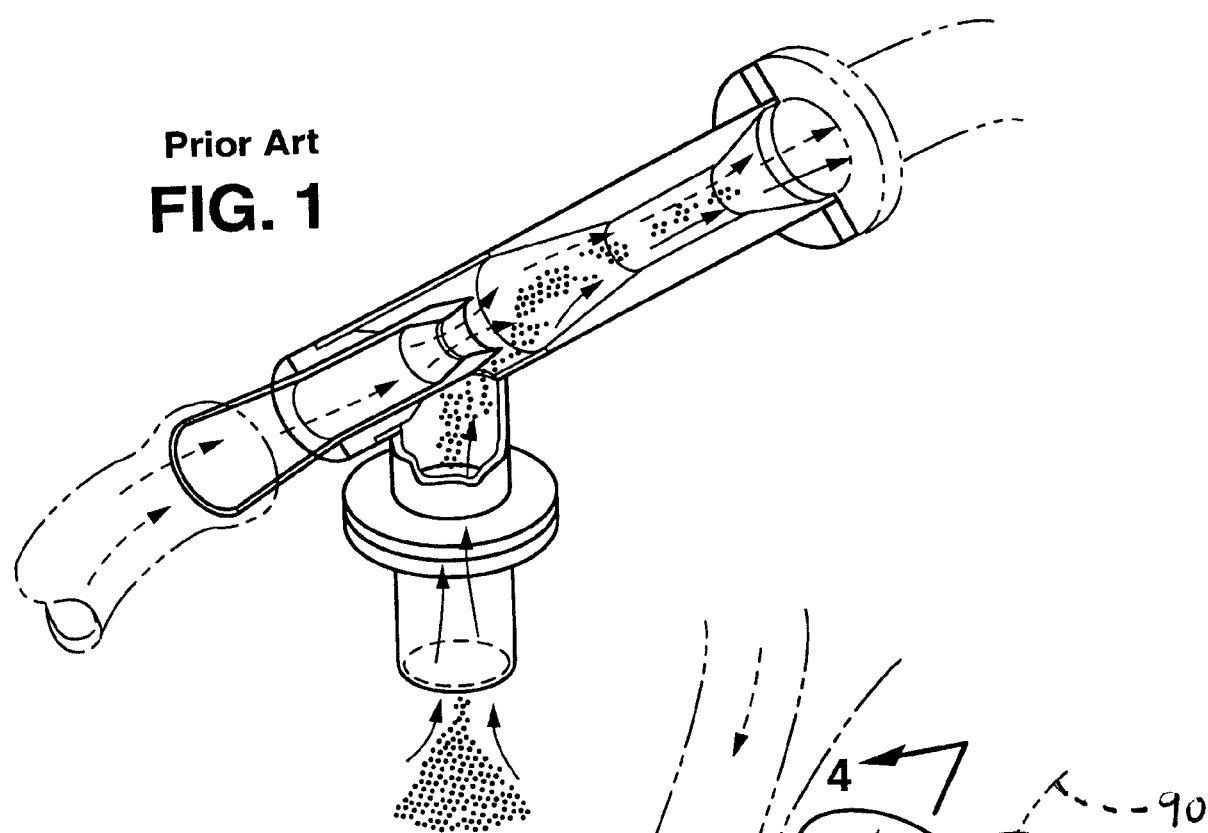
FIG. 1 is a view of a prior art venture-type conveyance nozzle.
Figure 2:
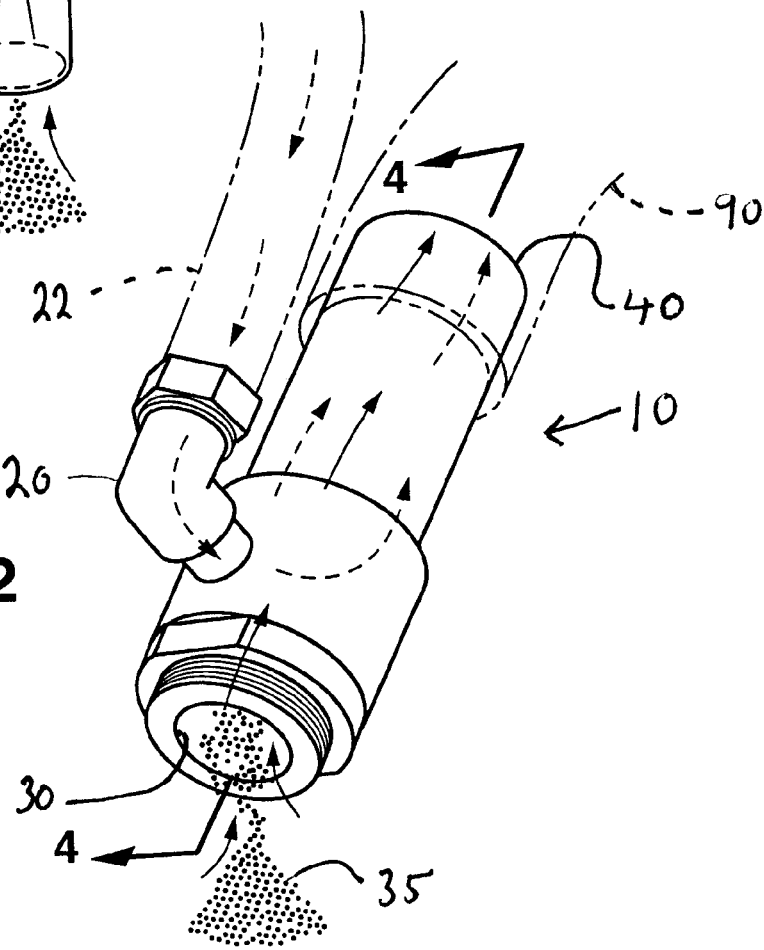
FIG. 2 is a perspective view of a nozzle of the present invention.
Figure 3:
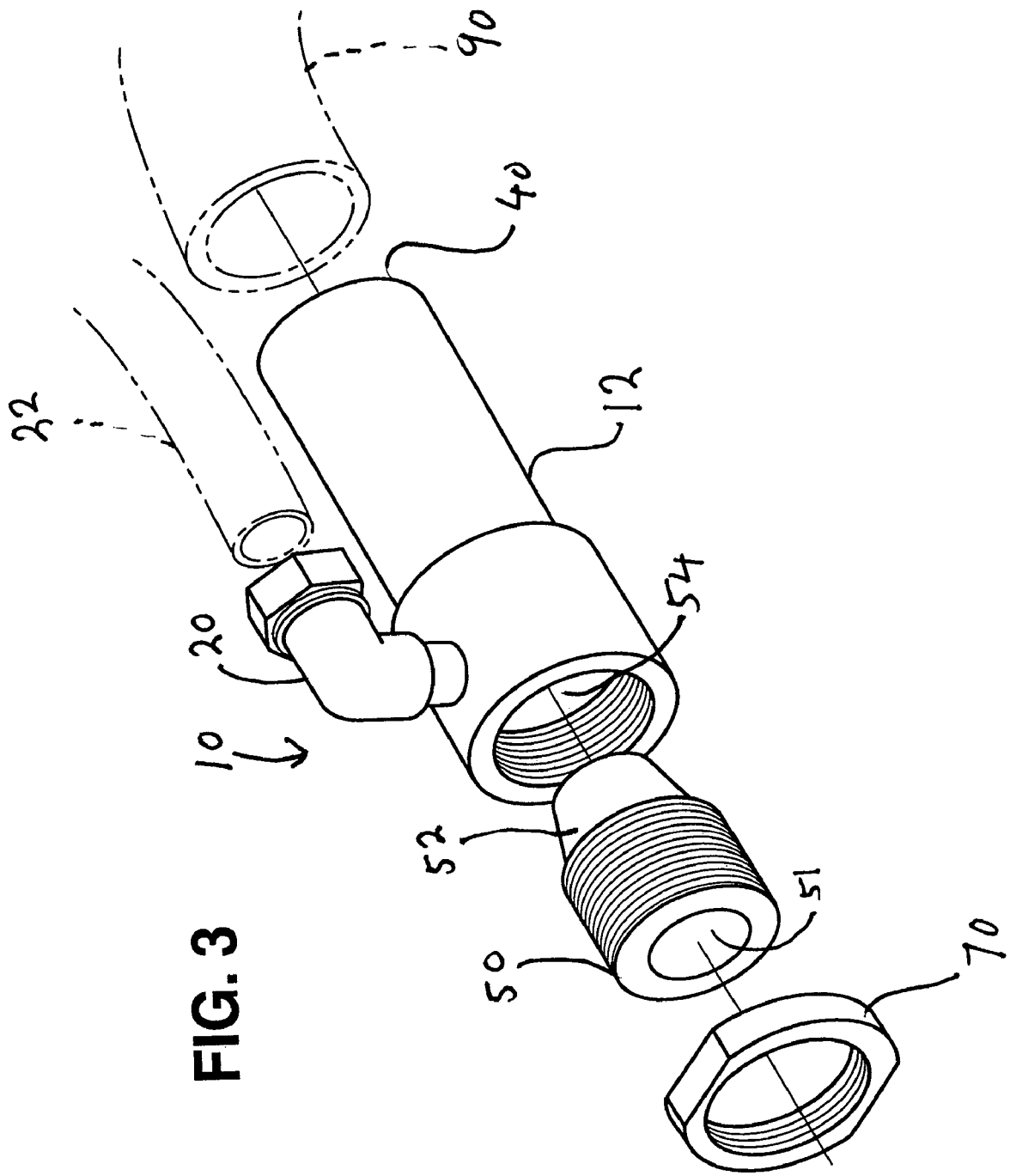
FIG. 3 is an exploded view of the nozzle seen in FIG. 2.

FIG. 1 is a prior art nozzle used for the transport of fine particulates or pellets a finite distance in height using a substantially 0° angle of air flow relative to the nozzle axis as seen by the dashed directional arrows. The air flow creates a vacuum which is used to intake material as seen by the solid directional arrows. One disadvantage of the prior art design is that the materials introduced into the nozzle experience a great deal of turbulence and friction created by the materials impinging upon interior baffles designed to redirect the particulates in a desired direction. The friction caused by the interengagement of the materials with the interior baffles, nozzle walls, and the associated direction change creates an enormous loss of energy with respect to the particles and air stream. As a result, there is an inherent loss of efficiency created by the design. Further, since the prior art venturi-type devices rely upon a vacuum-applied suction force, there are inherent limits as to height in which the materials may be removed.

As seen in reference to FIG. 2, the present invention uses a supply of pressurized gas to push particles through the nozzle in a manner which exhibits much greater efficiency and is capable of moving material to a height and along distances not possible with a venturi-type apparatus. As seen in reference to FIG. 2, a pneumatic nozzle 10 is in the form of tube 12 which defines a nozzle inlet 30 and a nozzle outlet 40. Attached to an edge wall of tube 12 is a coupling 20 which is adapted for delivering a pressurized gas into the interior of tube 12. As seen by the dashed directional arrows in FIG. 2, an overall flow pattern of a pressurized gas is illustrated. As further seen in reference in FIG. 2 by the solid arrows, a flow direction of a material waste mixture 35, which may be in the form of a particulate, a liquid, or a mixture of a liquid and a solid material, is indicated.

In reference to FIG. 3, the inlet 30 is provided by the interengagement of tube 12 and a hollow threaded plug 50 having a conical tapered exterior sidewall 52, sidewall 52 tapering to a reduced circumference in a direction toward outlet 40. As seen in FIG. 3, a threaded ring 70 may be used to lock the plug 50 in the proper threaded position within the interior of tube 12. As further seen in reference to FIG. 3, coupling 20 can be attached to a pressurized gas supply line 22. Similarly, outlet 40 can be connected to a flexible hose 90, hose 90 preferably having a smooth surface interior wall.

As seen in reference to FIGS. 3 and/or 4, in the assembled nozzle a pressurized gas is introduced into coupling 20 and which is directed into an cylindrical receiving chamber 54 defined within an interior of tube 12. As best seen in reference to FIG. 4, chamber 54 defines a cylindrical opening within nozzle 10 and which is adapted for receiving therethrough plug 50. The threaded portion of plug 50 serves to prevent pressurized gas which enters the chamber 54 from movement toward the inlet 30 of nozzle 10. As pressurized gas enters chamber 54, the pressurized gas through gap 60 and is able to flow freely around the exterior wall of plug 50. The tapered wall surfaces 52 direct the pressurized gas in a direction toward outlet 40.

Figure 4:
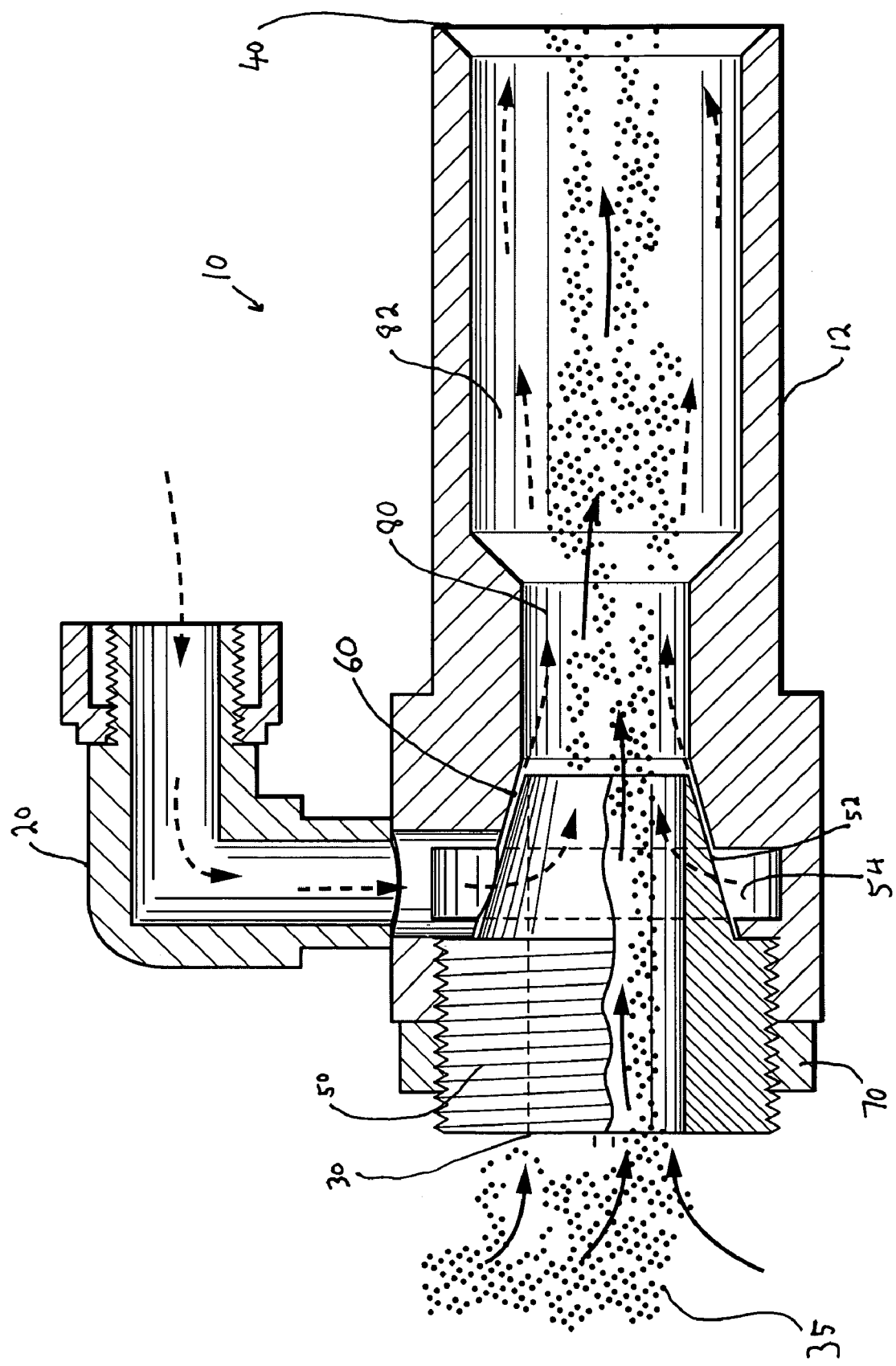
FIG. 4 is a sectional view taken along lines 4-4 of FIG. 2 showing the internal construction and passageways of the nozzle.

As seen in reference to FIG. 4, the plug 50 extends through the cylindrical chamber 54 such that the pressurized air exits chamber 54 through a gap defined between the tapered exterior surface of plug 50 and the corresponding sloped (tapered) interior wall portion adjacent mixing chamber 80. In one embodiment of the invention, it has been found that providing the tapered wall plug 52 and associated gap such that a 30° entry angle of pressurized gas relative to the longitudinal axis of the nozzle 10 is one effective entry angle. The approximately 30° angle for entry of pressurized gas has been found to maintain adequate flow of pressurized gas while maintaining desirable kinetics associated with the mixing and transport of debris and pressurized gas within the adjacent mixing chamber 80.

As can be seen in reference to FIG. 4, the degree in which plug 50 is threadably inserted into the nozzle 10 provides a method of regulating the flow of pressurized air. A deeper insertion of plug 50 into the nozzle 10 restricts the size of the gap 60 defined between the tapered plug wall 52 and the adjacent interior wall of nozzle 10. By controlling the size of the resulting gap 60, the volume/velocity of pressurized gas released into an interior of the mixing chamber 80 can be controlled. This, in turn, controls the amount of vacuum created at the inlet 30 of nozzle 10.

Plug 50 further defines an inner bore 51 which is in axial communication between the inlet 30 on one end and outlet 40 on the opposite end of plug 50. As the pressurized gas flows through the nozzle apparatus 10 as seen by the dashed directional arrows, a negative pressure is created at the inlet 30 across nozzle 10. The resulting negative pressure associated with inlet 30 allows for a material 35 to enter the interior of tube 12 via hollow plug 50 and thereafter be entrained within the flow of the pressurized gas.

Adjacent the tapered end of plug 50 the nozzle interior defines mixing chamber 80 where the pressurized gas and the material 35 are mixed. Unlike prior art devices, the mixture between the pressurized gas and the material 35 is one in which there is little energy loss between the air supply and the material 35. In other words, there are no sharp angle bends required for a material 35 to negotiate nor is material 35 impinged upon by baffles or edgewalls in order to undergo a change of direction. The improved kinetics of the mixture of the pressurized gas supply and the material 35 provides for a much more efficient flow through the nozzle.

As material 35 enters into the mixing chamber 80, the pressurized gas serves to "push" the particles in a direction toward outlet 40. As seen in reference to FIG. 4, the inner diameter of nozzle 10 may increase in a transition region as seen by a throat region 82 defined between the mixing chamber 80 and outlet 40. The increased inner diameter accommodates increased air flow brought about by the combination of the pressurized gas plus the air and entrained material entering along inlet 30 of nozzle 10. The pushing mode of directing particles with pressurized gas achieves a greater efficiency than applying a vacuum to move the particles.

Figure 5:
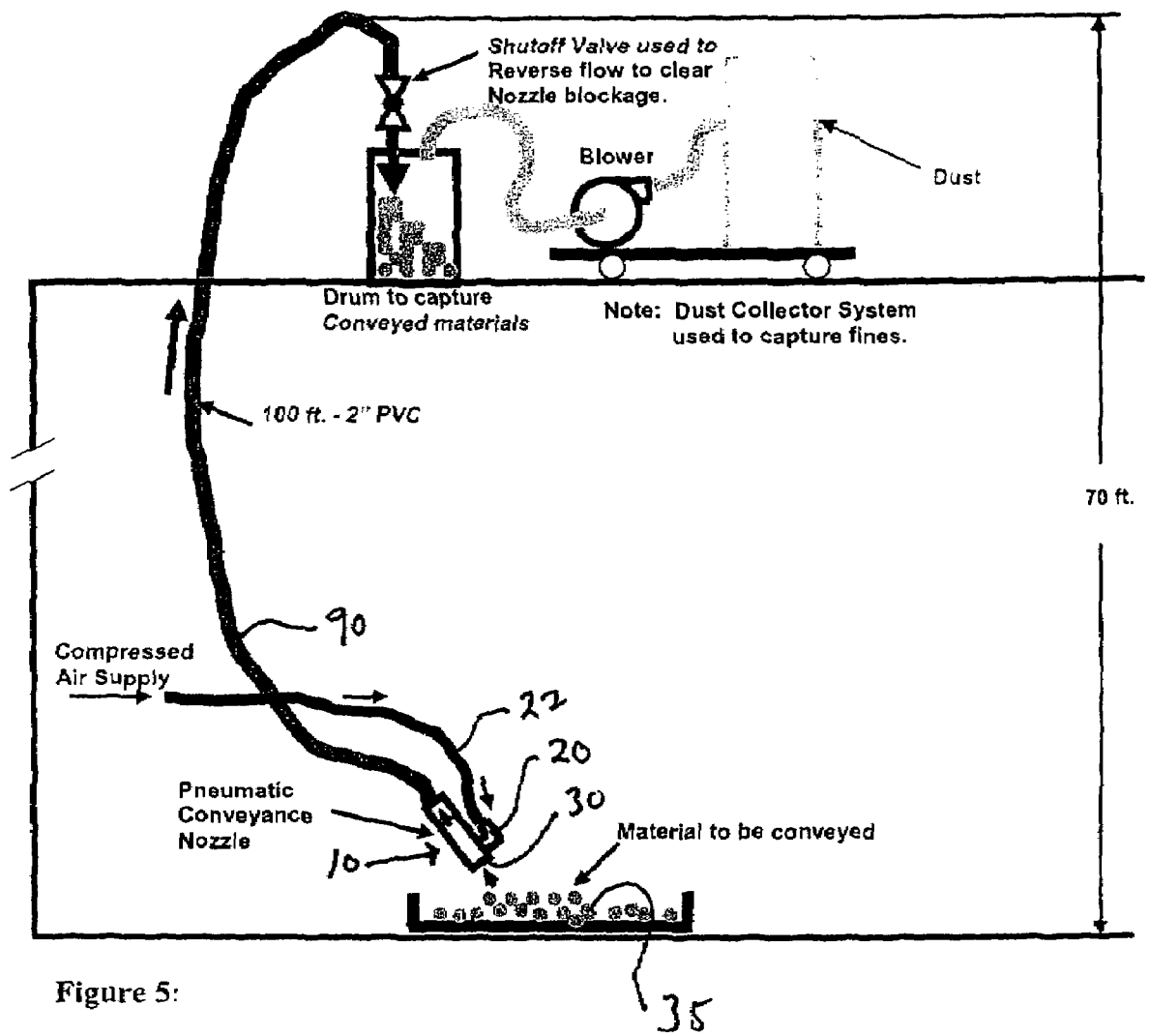
FIG. 5 illustrates an operating environment in which the pneumatic nozzle may be used to remove debris using a pressurized gas supply to push materials through the nozzle.

In reference to FIG. 5, the pneumatic nozzle 10 may be used to remove materials which may be located in inaccessible areas or in locations such as a hazardous waste tank which is unsafe for manual cleaning techniques. As illustrated, materials may be conveyed a significant distance and height using pressurized gas to direct materials through the nozzle 10 along a discharge hose 90 to a capture container such as a drain. A shut off valve may be supplied at a discharge location. The ability to terminate the flow allows for the pressurized gas flow to be redirected through the inlet 30 of the nozzle 10. This feature is useful as a method of clearing inlet 30 of any blockages that may occur from material 35. Depending upon the operating environment, material 35 may assume a variety of different sizes and shapes of material. At times, the material may occlude the inlet 30. By reversing the flow through the system, the inlet 30 may be easily cleaned through the induced back flow pressure of pressurized gas. Upon reopening the shut off valve, the flow and operation of the nozzle is resumed.

The pneumatic nozzle 10 as set forth in FIGS. 1 through 4 was evaluated for its ability to transport materials including dry sand, wet sand, aggregate rock having a maximum half-inch diameter, and water to a collection tank located at a elevation in excess of 40 feet relative to the nozzle. The nozzle 10 had a 1" inner diameter. The outlet 40 was attached to 100 feet of a 2" diameter PVC hose having a smooth inner wall surface. The nozzle and hose assembly were connected to a Kurz in-line mass flow transmitter to measure the air discharge flow rates of the nozzle. The flow rate of the pressurized gas supply was also measured to determine optimal settings for the nozzle velocity adjuster. The extent to which plug 50 and tapered wall 52 extends into the cylindrical chamber 54, as best seen in reference to FIGS. 3 and 4, controls the nozzle velocity at the inlet 30 and outlet 40 of nozzle 10. The air velocity as measured at the nozzle inlet (suction) and the nozzle discharge velocity at the nozzle outlet are measured for various settings.

As set forth in Tables 1 and 2, the supply and discharge flow rates at the inlet and the outlet were measured during performance testing. As seen in reference to FIG. 5, at times a dust collection unit was connected to the discharge side of the 2" diameter hose, however, the dust collection unit is not used to assist or increase in the material conveyance properties of the apparatus performance testing. Test data provided in Tables 1 and 2 demonstrated that it is possible to vary the nozzle velocity to achieve optimal performance for material being evaluated. With respect to the test nozzle described above it is found that a supply of the pressurized gas (air) provided at 80 psi results in a volume of approximately 50 SCFM. This produced an inlet velocity of approximately 11,400 SFPM. The nozzle outlet had a flow rate of 130 SCFM and velocity of approximately 6,600 SFPM which provides for a mass flow rate of between about 300 to about 500 cubic inches per minute (CIM) using a supply pressure of 80 psi and a supply flow rate of 50 SCFM. While not separately reported, it was observed that the inclusion of a dust collector unit provided an increase of approximately 20 SCFM when using lower supply flow rates.

TABLE 1

| Nozzle Velocity Adjuster Position (Turns CCW) | Nozzle Suction Port (1" Dia.) Velocity Measured (SFPM) | Suction Flow Calculated Dust Collector ON (CFM) | Nozzle Discharge Port (2" Dia.) Velocity Measured (SFPM) | Discharge Flow Measured Dust Collector ON (SCFM) | Air Supply Flow Rate @ 65–80 PSIG Measured (SCFM) |
|---|---|---|---|---|---|
| >0 | 9600 | 52.4 | 3380 | 62 | 8.8 |
| 1/8 | 10380 | 56.6 | 4440 | 82 | 21 |
| 1/4 | 11220 | 61.2 | 5450 | 103 | 36 |
| 3/8 | 11430 | 62.3 | 6050 | 117 | 51 |
| 1/2 | 11100 | 60.5 | 6640 | 131 | 58 |
| 5/8 | 10720 | 58.5 | 6960 | 136 | 68 |
| 3/4 | 10450 | 57.0 | 7390 | 142 | 75 |
| 7/8 | 10050 | 54.8 | 7580 | 146 | 81 |
| 1 | 9290 | 50.7 | 7740 | 149 | 91 |
| 1 1/8 | 8960 | 48.9 | 7790 | 151 | 96 |
| 1 1/4 | 8930 | 48.7 | 8010 | 156 | 100 |
| 1 3/8 | 13310 | 72.6 | 9270 | 181 | 102 |
| 1 1/2 | 13170 | 71.8 | 9310 | 181 | 104 |
| 1 5/8 | 12200 | 66.5 | 9140 | 178 | 108 |
| 1 3/4 | 11840 | 64.6 | 9090 | 177 | 108 |
| 1 7/8 | 11730 | 64.0 | 9200 | 179 | 111 |
| 2 | 11420 | 62.3 | 9170 | 178 | 112 |

TABLE 2

| Nozzle Velocity Adjuster Position (Turns CCW) | Nozzle Suction Port (1" Dia.) Velocity Measured (SFPM) | Suction Flow Calculated Dust Collector ON (CFM) | Nozzle Discharge Port (2" Dia.) Velocity Measured (SFPM) | Discharge Flow Measured Dust Collector OFF (SCFM) | Air Supply Flow Rate @ 65–80 PSIG Measured (SCFM) |
|---|---|---|---|---|---|
| >0 | 7140 | 38.9 | 2770 | 43 | 8.8 |
| 1/8 | 8740 | 47.7 | 3770 | 66 | 21 |
| 1/4 | 8950 | 48.8 | 4670 | 81 | 36 |
| 3/8 | 9160 | 50.0 | 5410 | 95 | 51 |
| 1/2 | 9090 | 49.6 | 6100 | 109 | 58 |
| 5/8 | 8430 | 46.0 | 6460 | 113 | 68 |
| 3/4 | 8750 | 47.7 | 6910 | 119 | 75 |
| 7/8 | 8240 | 44.9 | 7160 | 126 | 81 |
| 1 | 8420 | 45.9 | 7440 | 133 | 91 |
| 1 1/8 | 8560 | 46.7 | 7710 | 141 | 96 |
| 1 1/4 | 9790 | 53.4 | 8250 | 153 | 100 |
| 1 3/8 | 13100 | 71.4 | 9150 | 178 | 102 |
| 1 1/2 | 12860 | 70.1 | 9230 | 178 | 104 |
| 1 5/8 | 11660 | 63.6 | 9050 | 172 | 108 |
| 1 3/4 | 11020 | 60.1 | 8930 | 171 | 108 |
| 1 7/8 | 10840 | 59.1 | 9010 | 173 | 111 |
| 2 | 10690 | 58.3 | 9030 | 172 | 112 |

Using the set up as described above, the pneumatic conveyance nozzle 10 was able to successfully convey materials along the 100 foot length of the PVC conduit into a height of 70 feet above the nozzle position. The ability to transport materials through nozzle 10 to such heights and distances is not possible using conventional venturi-type nozzles. The nozzle design has improved particle kinetics and provides a pneumatic "push" that allows the materials to be moved greater distances and elevations than is possible using vacuum technologies.

The nozzle 10 is shown to be capable of lifting materials in excess of 70 feet using a nozzle construction that, in operation, requires no moving parts. Further, the improved conveyance uses a lower air consumption than prior art vacuum-type devices and therefore is more economical to operate.

The nozzle is particularly well adapted for use in the removal of waste material from underground waste tanks and other facilities. The nozzle is also useful with various cleaning devices such as a scarifier which may use a series of rapidly rotating brush bristles to clean a surface. Suitable scarifiers typically have a pneumatic drive motor which is used to engage the brush. One such scarifier suitable for modification as described herein is commercially available from Desco Manufacturing Company, Rancho Santa Margarita, Calif. 92688 or a Novatek TFP-9 Scarifier, Novatek Corporation, Exton, Pa. 19341.

Commercially available scarifiers, such as those identified above, are available in electric, gas powered, and air powered systems. Suitable units include both hand held and wheeled units. Commercially available scarifiers use rotating wheels, chains, cleats, or other substrates to abrade a surface to remove surface material such as contamination, paint, rust, scale, or corrosion. By attaching the nozzle 10 to the existing vacuum supply line, the combination scarifier and nozzle 10 provides an effective way of removing material waste generated by the scarifier through nozzle 10.

For hazardous environments, there are specialized scalers such as those commercially available from Pentek, Coraopolis, Pa. 15108, which provide for air operation of a scaler having a built-in vacuum port. Attachment of the nozzle 10 to the vacuum port allows the scaler to be used along with the transport of debris great distances. Details on the scalers available from Pentek may be seen in reference to the 1996 Pentek, Inc., Bulletin #M-700, © 1996 and which is incorporated herein by reference.

For other types of scarifiers, pneumatic nozzle 10 may be attached by an adapter plate to a discharge location in the vicinity of the scarifier. In such a manner as the scarifier cleans a surface, the pneumatic nozzle 10 receives the debris for transport to a collection drum or other receptacle.

The combination of a scarifier and a pneumatic nozzle (Desco Manufacturing Company Model M225) was tested using a compacted mixture of plaster, sand, and rock. While the scarifier produced a new material having various sizes and textures, the nozzle 10 was able to remove the waste debris generated by the scarifier.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

The invention claimed is:

1. A pneumatic nozzle comprising:
a substantially linear conduit having a material inlet defined along one end of the conduit and an outlet defined on the opposite end of the conduit;
a coupling attached to a side of the conduit, the coupling adapted for introducing a pressurized supply gas into a receiving chamber defined within an interior of the conduit, the receiving chamber having disposed therein a conical plug in which the outer wall is tapered toward the outlet, the conical plug further defining a bore therethrough, the bore being in axial alignment with the inlet and the outlet of the conduit;
wherein when the supply gas is introduced through the coupling, the supply gas enters a cylindrical-shaped chamber and is directed along a gap defined between the outer wall of the conical plug and an interior nozzle wall toward the outlet, the flow of the supply gas creating a negative pressure at the inlet which may be used to introduce a material into the interior of the nozzle, where the supply gas pushes the material toward an outlet of the nozzle.

2. A nozzle for the uptake and transport of material comprising:
a conduit having an inlet, an outlet, and an axial passageway defined therebetween;
a supply gas coupling having a coupling inlet and a coupling outlet, the coupling outlet in communication with a chamber defined within said axial passageway;
a plug extending from said inlet and defining a bore therebetween, said bore in alignment with said axial passageway, said plug further defining an exterior wall surface, a portion of said exterior wall surface extending through said chamber;
a gap defined between said exterior wall or surface of said plug and an interior wall of said conduit, said gap providing communication between said chamber and a mixing chamber, said mixing chamber defined by an interior of said conduit and opposite a plug terminus, said mixing chamber in further communication with said outlet;
wherein when a supply gas enters said chamber, said supply gas passes through said gap and enters into said mixing chamber, the flow of said supply gas through the mixing chamber establishing a reduced pressure at said inlet through which said material may enter the nozzle through an inlet, passing through the plug bore and entering into said mixing chamber.

3. The nozzle according to claim 2 wherein said exterior wall of said plug defining said gap is tapered.

4. The nozzle according to claim 3 wherein said interior wall of said conduit defining said gap is tapered.

5. The nozzle according to claim 2 wherein said plug defines a threaded exterior adapted to engage a corresponding threaded portion defined by an interior of said axial passageway in proximity to said inlet.

6. The nozzle according to claim 2 wherein the greater a length of said plug is threadably inserted into said inlet, a resulting width of said gap is decreased.

7. The nozzle according to claim 2 wherein said chamber has a cylindrical shaped inner wall.

8. The nozzle according to claim 2 wherein an inner diameter of said mixing chamber is less than an inner diameter of said axial passageway adjacent said outlet.

9. The nozzle according to claim 2 wherein said axial passageway through which material is transported is substantially linear.

10. The nozzle according to claim 2 wherein said gap for introducing a supply gas into said mixing chamber is at an angle of about 30° relative to a longitudinal axis of said passageway.

11. A process of conveying waste material through a nozzle comprising the steps of:
supplying a nozzle comprising a conduit having an inlet, an outlet, and an axial passageway defined therebetween;
a supply gas coupling having a coupling inlet and a coupling outlet, the coupling outlet in communication with a chamber defined within said axial passageway;
a plug extending from said inlet and defining a bore therebetween, said bore in alignment with said axial passageway, said plug further defining an exterior wall surface, a portion of said exterior wall surface extending through said chamber;
a gap defined between said exterior wall or surface of said plug and an interior wall of said conduit, said gap providing communication between said chamber and a mixing chamber, said mixing chamber defined by an interior of said conduit and opposite a plug terminus, said mixing chamber in further communication with said outlet;
introducing into the nozzle a supply gas, the supply gas entering the nozzle under pressure and impinging upon a tapered wall positioned within a cylindrical chamber and which directs the supply gas toward an outlet;
establishing a reduced pressure at an inlet of the nozzle, the reduced pressure established by the directional flow and velocity of the supply gas;
introducing a waste material into the inlet, the reduced pressure conveying the waste material into an interior of the nozzle;
intermixing the waste material and the supply gas within a mixing chamber defined within an interior of said nozzle;
pushing the waste material from the chamber by the continuous flow of the supply gas and intermixed waste through the nozzle;
wherein the waste material and the supply gas exits the nozzle.

* * * * *

UNITED STATES PATENT AND TRADEMARK OFFICE
CERTIFICATE OF CORRECTION

| | | |
|---|---|---|
| PATENT NO. | : 7,708,504 B2 | Page 1 of 1 |
| APPLICATION NO. | : 11/214240 | |
| DATED | : May 4, 2010 | |
| INVENTOR(S) | : Heckendorn et al. | |

It is certified that error appears in the above-identified patent and that said Letters Patent is hereby corrected as shown below:

Title Page item (75), Inventor Athneal D. Marzolf last name is spelled incorrectly. Letters patent shows last name Matzolf, should be Marzolf as shown on filing receipt.

Signed and Sealed this
Eighth Day of February, 2011

David J. Kappos
*Director of the United States Patent and Trademark Office*